United States Patent
Keithley et al.

(10) Patent No.: US 7,697,169 B2
(45) Date of Patent: Apr. 13, 2010

(54) LASER PRINT APPARATUS WITH TONER EXPLOSION COMPENSATION

(75) Inventors: Douglas Gene Keithley, Boise, ID (US); Roy Gideon Moss, Palo Alto, CA (US)

(73) Assignee: Marvell International Technology Ltd. (BM)

(*) Notice: Subject to any disclaimer, the term of this patent is extended or adjusted under 35 U.S.C. 154(b) by 869 days.

(21) Appl. No.: 10/977,247

(22) Filed: Oct. 29, 2004

(65) Prior Publication Data
US 2006/0092438 A1 May 4, 2006

(51) Int. Cl.
H04N 1/407 (2006.01)
G06K 9/62 (2006.01)
G06K 9/40 (2006.01)

(52) U.S. Cl. ............ 358/3.27; 358/1.2; 358/1.9; 358/3.1; 358/3.12; 358/3.26; 382/199; 382/205; 382/209; 382/218; 382/254; 382/255; 382/266; 382/268; 382/269

(58) Field of Classification Search ......... 345/611; 358/3.26–3.27, 1.2, 1.9, 2.99, 532; 382/159, 382/164, 165, 170, 171, 176, 181–269
See application file for complete search history.

(56) References Cited

U.S. PATENT DOCUMENTS

| | | | |
|---|---|---|---|
| 4,776,023 A * | 10/1988 | Hamada et al. ............ 382/147 |
| 4,817,179 A * | 3/1989 | Buck ............................ 382/254 |
| 4,868,684 A | 9/1989 | Suzuki |
| 5,005,139 A * | 4/1991 | Tung ............................ 358/1.1 |
| 5,073,952 A * | 12/1991 | Watanabe .................. 382/152 |
| 5,144,338 A | 9/1992 | Sakano |
| 5,235,650 A * | 8/1993 | Jeong .......................... 382/158 |
| 5,237,646 A * | 8/1993 | Bunce ......................... 358/1.18 |
| 5,357,583 A * | 10/1994 | Sato et al. .................. 382/269 |
| 5,392,061 A | 2/1995 | Vondran, Jr. |
| 5,440,407 A * | 8/1995 | Overton ..................... 358/447 |
| 5,483,355 A * | 1/1996 | Overton ..................... 358/463 |
| 5,483,625 A * | 1/1996 | Robertson et al. .......... 358/1.18 |
| 5,581,292 A | 12/1996 | Cianciosi et al. |
| 5,630,026 A * | 5/1997 | Ogletree et al. ............. 358/1.7 |
| 5,659,849 A | 8/1997 | Lindblad et al. |
| 5,784,091 A | 7/1998 | Ema et al. |
| 5,801,843 A * | 9/1998 | Overton ..................... 358/447 |
| 5,812,742 A * | 9/1998 | Hanyu ........................ 358/1.2 |
| 6,129,457 A * | 10/2000 | Thompson et al. ......... 358/1.2 |
| 6,167,509 A * | 12/2000 | Sites et al. ................. 712/237 |

(Continued)

FOREIGN PATENT DOCUMENTS

GB          2250397 A      6/1996

(Continued)

OTHER PUBLICATIONS

A partial GB Search Report for Application No. GB0522057.9 mailed Dec. 16, 2005 (1 pg.).

(Continued)

*Primary Examiner*—King Y Poon
*Assistant Examiner*—Richard Z Zhu

(57) ABSTRACT

A printing apparatus comprises a processor comprising registers, and a memory configured to store image data. The processor is configured to load portions of the image data into the registers and perform toner explosion compensation on the portions of the image data loaded in the registers, excluding image data loaded in boundary positions in the registers.

22 Claims, 7 Drawing Sheets

U.S. PATENT DOCUMENTS

| | | |
|---|---|---|
| 6,178,011 B1 | 1/2001 | Lin et al. |
| 6,250,742 B1 | 6/2001 | Kido |
| 6,304,278 B1 * | 10/2001 | Coleman ............... 347/110 |
| 6,320,977 B1 * | 11/2001 | Tokura ............... 382/151 |
| 6,321,055 B1 | 11/2001 | Mashtare et al. |
| 6,333,998 B1 | 12/2001 | Matsumoto |
| 6,342,953 B1 | 1/2002 | Wibbels et al. |
| 6,415,062 B1 * | 7/2002 | Moed et al. ............ 382/260 |
| 6,571,080 B2 | 5/2003 | Lee et al. |
| 6,580,896 B2 | 6/2003 | Lee |
| 6,760,126 B1 | 7/2004 | Kritayakirana et al. |
| 6,819,452 B1 * | 11/2004 | Richtsmeier et al. ....... 358/1.9 |
| 6,850,651 B2 * | 2/2005 | Zaklika et al. ........... 382/275 |
| 7,003,174 B2 * | 2/2006 | Kryukov et al. .......... 382/266 |
| 7,173,734 B2 * | 2/2007 | Klassen et al. ........... 358/1.9 |
| 7,251,061 B2 * | 7/2007 | Larson et al. ........... 358/3.27 |
| 2002/0115011 A1 | 8/2002 | Komoto et al. |
| 2002/0195053 A1 | 12/2002 | Mey et al. |
| 2003/0048472 A1 | 3/2003 | Perdu et al. |
| 2003/0134215 A1 | 7/2003 | Kashiwabara et al. |
| 2003/0138711 A1 | 7/2003 | Kabata et al. |
| 2003/0231350 A1 | 12/2003 | Yamagishi |

FOREIGN PATENT DOCUMENTS

| | | |
|---|---|---|
| GB | 2 405 510 | 3/2005 |
| JP | 05167850 A | 7/1993 |
| JP | 2854179 | 11/1998 |
| JP | 2000-125128 A | 4/2000 |

OTHER PUBLICATIONS

Examination Report for Great Britain counterpart application No. GB0416743.3, Mar. 3, 2006, 2 pages.

* cited by examiner

Fig. 3A

| | |
|---|---|
| Reg 1 | 00000000h - row 1 |
| Reg 2 | FFFFFFFFh - row 2 |
| Reg 3 | FFFFFFFFh - row 3 |
| Reg 4 | FFFFFFFFh - row 4 |
| Reg 5 | FFFFFFFFh - row 5 |

204 points to middle row.

202 →
| 1 | 1 | 1 |
|---|---|---|
| 1 | 1 | 1 |
| 1 | 1 | 1 |
| 1 | 1 | 1 |
| 0 | 0 | 0 |

206 points to middle row.

214 points to middle row.

212 →
| 11 | 11 | 11 |
|----|----|----|
| 11 | 11 | 11 |
| 11 | 11 | 11 |
| 11 | 11 | 11 |
| 00 | 00 | 00 |

216 points to middle row.

224 points to middle row.

222 →
| 10 | 10 | 10 |
|----|----|----|
| 10 | 10 | 10 |
| 10 | 10 | 10 |
| 10 | 10 | 10 |
| 00 | 00 | 00 |

226 points to middle row.

LASER PRINT APPARATUS WITH TONER EXPLOSION COMPENSATION

BACKGROUND

Color and gray value digital images are both composed of picture elements (pixels), where each pixel is represented by multiple binary bits that define either a color or a gray level. In order to represent such an image on a bi-level printer, the individual color or gray level pixels are typically converted to binary level pixels through use of a digital halftoning process.

In addition to digital halftoning, the images are compensated for toner explosion conditions. Toner explosion is a problem which occurs in laser or light emitting diode (LED) printers. If uncorrected, certain line widths of toner may have parts of the line appear to be exploded and scattered down the page as illustrated in FIG. 1 at 58. The toner explosion problem is related to the amount and placement of toner on the media and the moisture content of the media. Laser printers typically statically attach toner to media and then permanent fuse or melt the toner into the media with a fuser, which heats and presses the media. Moisture in the media attempts to escape when the media is heated and pressured in the fuser of the printer that can cause the toner to relocate (i.e., explode and scatter) down the media. Large areas of toner may have the same toner explosion problem, but with lots of other toner around, the toner typically cannot relocate down the page. Toner explosion can also occur at the bottom edge of any black area.

Template matching is typically performed on 1-bit data to essentially estimate what the original smooth shapes of the image features were in the grayscale image (i.e., prior to halftoning) and to identify toner explosion conditions. Template matching compares a window (e.g., 7×9 pixels) of the 1-bit data with hundreds of templates to identify features in the window and to identify toner explosion conditions. The window is moved around the entire 1-bit image to identify features and toner explosion conditions throughout the entire image. All bits in the image are processed. If a template matches the window, the center bit of the window is replaced. The processed image has jagged edges removed or reduced and toner explosion conditions eliminated or substantially reduced in the printed output. Typically, template matching is performed by dedicated hardware.

SUMMARY

One aspect of the present invention provides a printing apparatus. The printing apparatus comprises a processor comprising registers, and a memory configured to store image data. The processor is configured to load portions of the image data into the registers and perform toner explosion compensation on the portions of the image data loaded in the registers, excluding image data loaded in boundary positions in the registers.

BRIEF DESCRIPTION OF THE DRAWINGS

FIG. 3A is a table illustrating one embodiment of registers with sample data.

FIG. 3B is a table illustrating one embodiment of the registers with sample data.

FIG. 4A is a diagram illustrating one embodiment of two toner explosion templates for 1-bit pattern matching.

FIG. 4B is a diagram illustrating two toner explosion templates for binary code 2-bit pattern matching.

FIG. 4C is a diagram illustrating one embodiment of two toner explosion templates for gray code 2-bit pattern matching.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
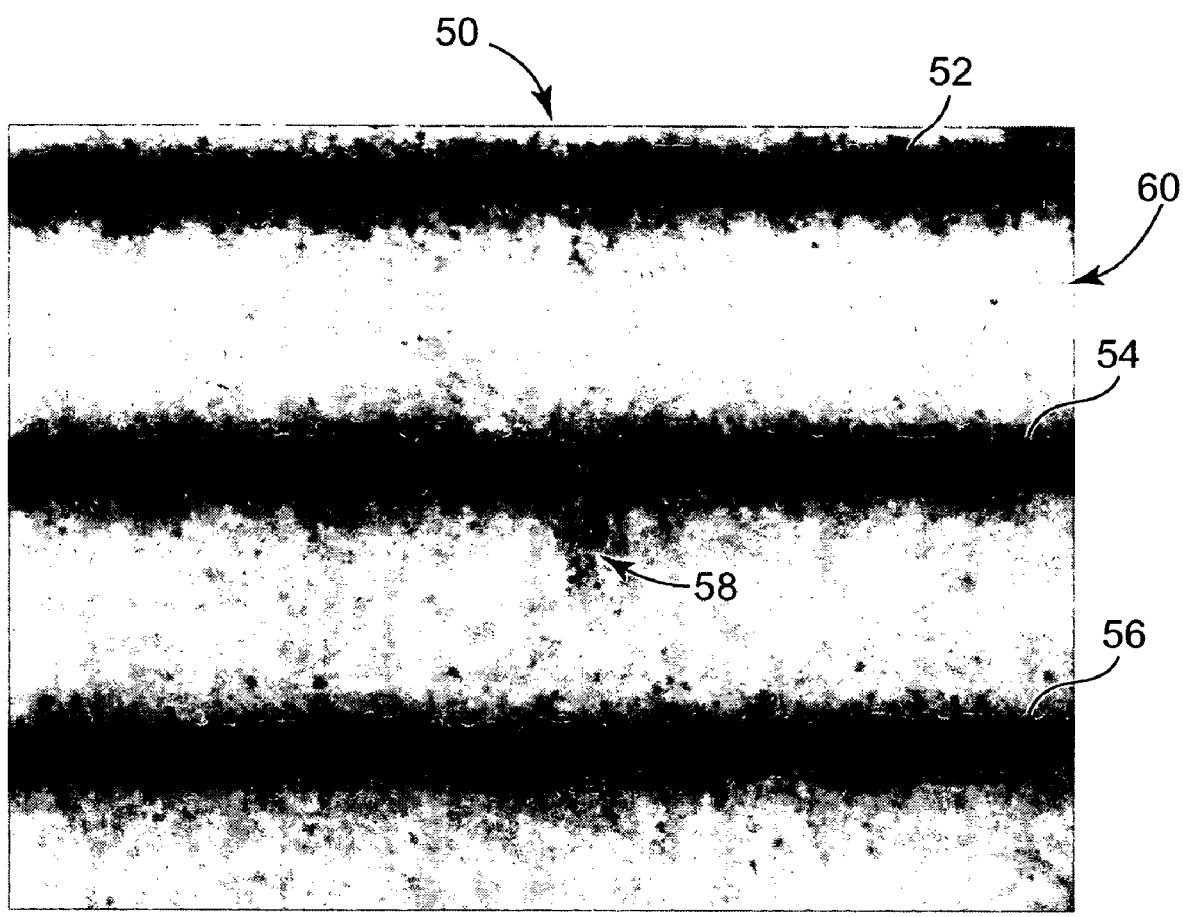
FIG. 1 is an image illustrating an example of toner explosion.

FIG. 1 is an image illustrating an example 50 of toner explosion. Toner explosion example 50 includes lines 52, 54, and 56 printed on paper 60. Toner explosion is indicated at 58 beneath line 54. Toner explosion 58 occurred due to the amount and placement of toner on line 54 and the moisture content of paper 60. Moisture in paper 60 attempted to escape when paper 60 was heated and pressured in a fuser of the printer. In the fuser of the printer, some of the toner was relocated down the page, as indicated at 58. By reducing the amount of toner in certain areas on line 54, the toner explosion indicated at 58 can be prevented or substantially reduced.

Figure 2A:
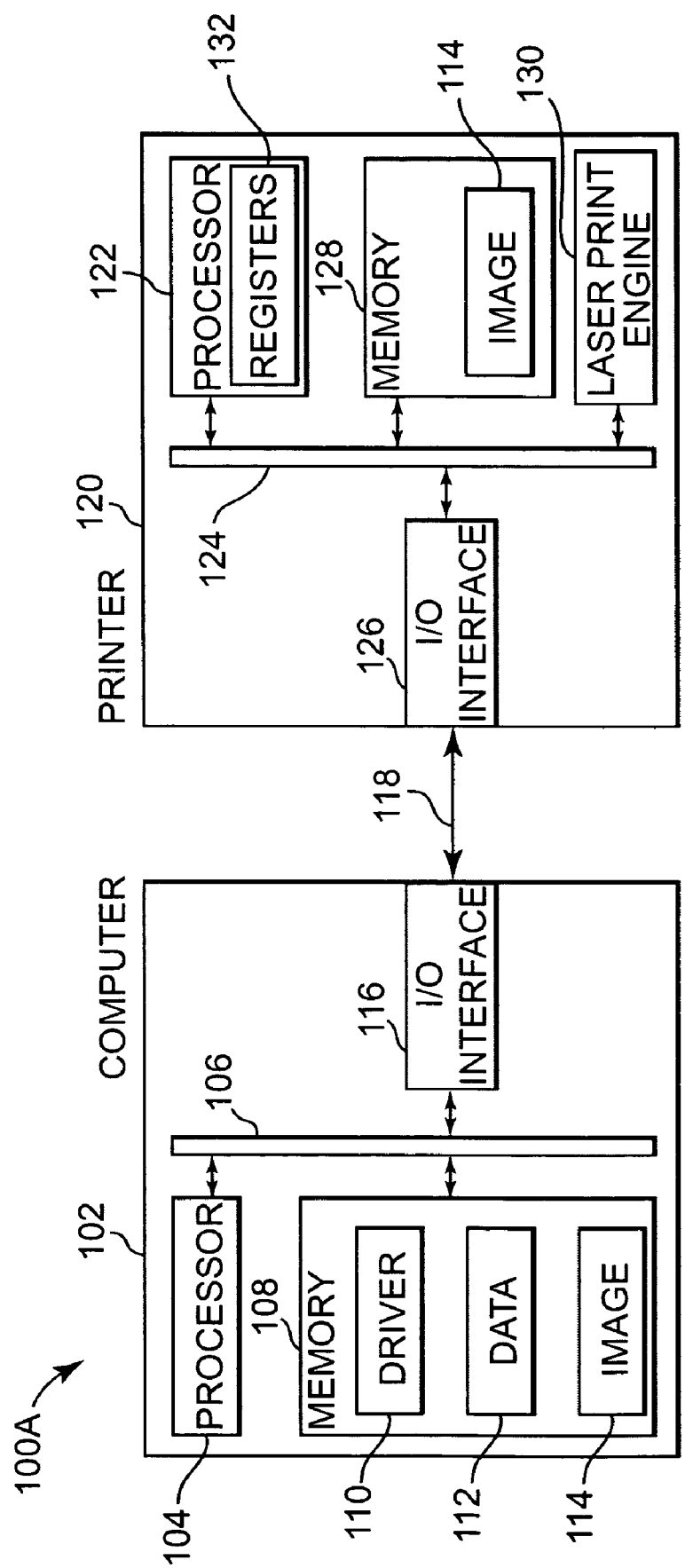
FIG. 2A is a block diagram illustrating one embodiment of major components of a printing system.

FIG. 2A is a block diagram illustrating one embodiment of major components of a printing system 100A. Printing system 100A includes a host or computer 102 and printer 120. In one embodiment, printer 120 is a laser printer or laser print apparatus. Printing system 100A is configured to perform toner explosion compensation on image data before the image data is printed.

Computer 102 includes processor 104, memory 108, and input/output (I/O) interface 116, which are communicatively coupled together via bus 106. Driver 110, data 112 to be printed, and image data 114 are stored in memory 108. In one embodiment, driver 110 is executed by processor 104 to render data 112 to be printed into image data 114. Data 112 to be printed may be any type of printable data, such as image files, word processing files, etc. In one embodiment, image data 114 comprises rows and columns, with one pixel defined at the intersection of each row and column. In one form of the invention, image data 114 includes a plurality of pixels, with each pixel being represented by a multi-bit value (i.e., each pixel is represented by an N-bit value, where N is greater than one). In another embodiment, each pixel in image data 114 is represented by a 2-bit value (e.g., black, white, and two gray levels). In another embodiment, each pixel is represented by a 1-bit value (e.g., black and white).

Printer 120 includes processor 122, I/O interface 126, memory 128, and laser print engine 130, which are communicatively coupled together via bus 124. In one embodiment, processor 122 is a custom processor for implementing custom instructions for performing toner explosion compensation.

I/O interface 126 of printer 120 is electrically coupled to I/O interface 116 of computer 102 through communication link 118. In one embodiment, I/O interfaces 116 and 126 are serial interfaces, such as universal serial bus (USB) interfaces, and communication link 118 is a USB cable. In another embodiment, I/O interfaces 116 and 126 are network interfaces, and communication link 118 is a network, such as a local area network. In other embodiments, other suitable types of interfaces and communication links may be used, including those for wireless communications.

After rendering data 112 into image data 114, computer 102 outputs the image data 114 to printer 120 via communication link 118. The received image data 114 is stored in memory 128 of printer 120, where processor 122 performs toner explosion compensation on image data 114 using registers 132, as described in further detail below with reference to FIGS. 3-7. After toner explosion compensation is complete, laser print engine 130 retrieves the toner explosion compensated data from memory 128 and prints the data to media. In another embodiment, toner explosion compensation is performed by computer 102.

Figure 2B:
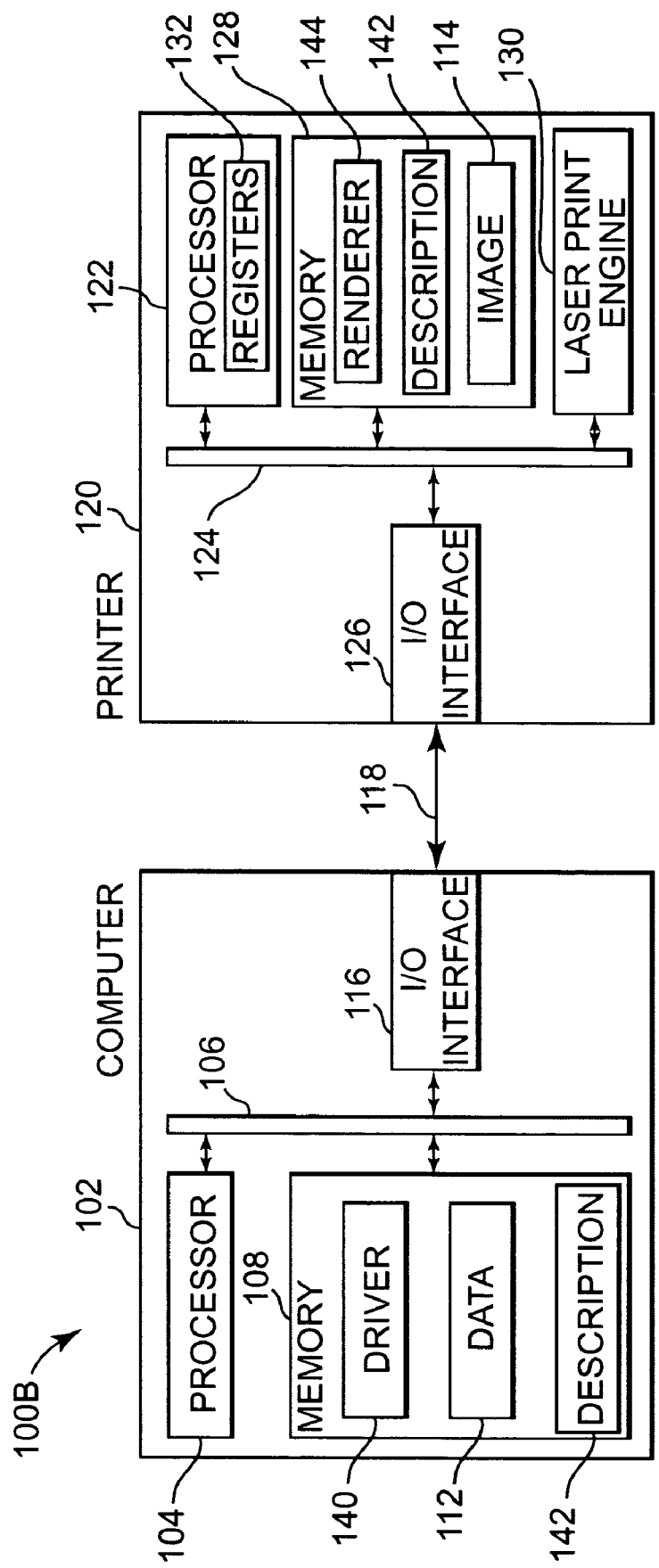
FIG. 2B is a block diagram illustrating another embodiment of major components of a printing system.

FIG. 2B is a block diagram illustrating another embodiment of major components of a printing system 100B. Printing system 100B includes similar hardware as printing system 100A. But in system 100B, image data 114 is rendered by printer 120, rather than by computer 102. In one embodiment, driver 140 converts data 112 to be printed into a description file 142. In one form of the invention, driver 140 is a printer command language (PCL) driver for converting data 112 into a description file 142 that includes data and high level commands (e.g., place a Helvetica 12 point letter "Q" at location x, y on the page). Computer 102 transfers description file 142 to printer 120 via communication link 118, and printer 120 stores description file 142 in memory 128.

Processor 122 then renders description file 142 into image data 114. In one embodiment, printer 120 includes PCL firmware for rendering description file 142 into image data 114. Image data 114 is stored in memory 128 of printer 120, where processor 122 performs toner explosion compensation on image data 114 using registers 132, as described in further detail below with reference to FIGS. 3-7. After toner explosion compensation is complete, laser print engine 130 retrieves the toner explosion compensated data from memory 128 and prints the data to media.

FIG. 3A is a table illustrating one embodiment of registers 132 with sample data. In one embodiment, registers 132 includes five 32-bit registers, Reg1-Reg5. In other embodiments, registers 132 can include any suitable number of registers including any suitable number of bits in each register, such as 8, 16, 64, 128, etc. In one embodiment, registers 132 are used to temporarily store 32-bits of 1-bit per pixel data from five consecutive rows, row 1-row 5, of image data 114 for performing toner explosion compensation on image data 114. Every portion of image data 114 systematically passes once through registers 132 for toner explosion compensation.

FIG. 3B is a table illustrating one embodiment of registers 132 with sample data. Reg1-Reg5 each contain 32-bits of 1-bit per pixel data from rows 1-5 of image data 114. To compensate for toner explosion, processor 122 analyzes the pixel data in Reg1-Reg5 to determine if toner explosion conditions exist. In one embodiment, the pixel data is analyzed by comparing the pixel data to patterns or templates that indicate toner explosion conditions. Toner explosion patterns, in one embodiment, are three columns wide and five rows tall. The center pixel (i.e., the pixel in column two, row three) in the pattern is modified if toner explosion conditions are found. In this example, row three is examined for toner explosion conditions since it contains the pixel data in the center of a pattern.

Columns one and 32 have boundary issues such that they need additional pixel information before a pattern could be examined. The pixels in column one would need pixel data from the column to their left and the pixels in column 32 would need pixel data from the column to their right. In one embodiment, this would add complexity and time to account for these boundary conditions. Therefore, these boundary pixels are left unexamined, and the entire register of data in row three excluding columns one and 32 is operated on without regard to any adjacent pixels (i.e., those not currently in the registers). Therefore, 30 pixels out of each group of 32 pixels have toner explosion compensation applied. In one embodiment, this is just as effective and cannot be distinguished from accounting for the boundary regions and applying the compensation to all possible pixels.

In this example, row three, column one, indicated at 150 is a boundary position and row three; column 32, indicated at 152, is also a boundary position. At positions 150 and 152, toner explosion compensation is not performed since there is no data to the left of position 150 and there is no data to the right of position 152 to compare to the toner explosion patterns. In the remaining register positions in row three, columns 2-31, indicated at 154, toner explosion compensation is performed.

FIG. 4A is a diagram illustrating one embodiment of two toner explosion templates 200 and 202 for 1-bit pattern matching. Template 200 includes five rows and three columns of 1-bit per pixel data. The center pixel, indicated at 204, is the pixel being examined for toner explosion compensation. If pattern 200 matches a portion of image data 114 loaded in registers 132, center pixel 204 of image data 114 contributes to potential toner explosion conditions. Center pixel 204 is modified to compensate for the toner explosion conditions based upon its position in image data 114. In one embodiment, center pixel 204 of image data 114 is changed from "1" to "0" if pattern 200 matches and an adjacent pixel also contributing to potential toner explosion conditions has not been changed. In another embodiment, center pixel 204 of image data 114 is not changed if pattern 200 matches and an adjacent pixel also contributing to potential toner explosion conditions has been changed. In one form of the invention, pixels contributing to potential toner explosion conditions are modified in a checkerboard pattern. In other embodiments, more complex patterns are used.

Toner explosion template 202 also includes five rows and three columns, and the center pixel, indicated at 206, is the pixel being examined for toner explosion compensation. In other embodiments, other templates having different numbers of rows and columns and different patterns of ones and zeros can be used. If pattern 202 matches a portion of image data 114 loaded in registers 132, center pixel 206 of image data 114 contributes to potential toner explosion conditions. Center pixel 206 is modified to compensate for the toner explosion conditions based upon its position in image data 114. In one embodiment, center pixel 206 of image data 114 is changed from "1" to "0" if pattern 202 matches and an adjacent pixel also contributing to potential toner explosion conditions has not been changed. In another embodiment, center pixel 206 of image data 114 is not changed if pattern 202 matches and an adjacent pixel also contributing to potential toner explosion conditions has been changed. In one form of the invention, pixels contributing to potential toner explosion conditions are modified in a checkerboard pattern. In other embodiments, more complex patterns are used.

FIG. 4B is a diagram illustrating one embodiment of two toner explosion templates 210 and 212 for 2-bit binary code pattern matching. Toner explosion template 210 includes five rows and three columns of 2-bit binary code per pixel data. The center pixel, indicated at 214, is the pixel being examined for toner explosion compensation. If pattern 210 matches a portion of image data 114 loaded in registers 132, center pixel 214 of image data 114 is modified to compensate for the toner explosion conditions. In one embodiment, center pixel 214 of image data 114 is changed from "11" to "01" or "00" if pattern 210 matches.

Toner explosion template 212 also includes five rows and three columns, and the center pixel, indicated at 216, is the pixel being examined for toner explosion compensation. If pattern 212 matches a portion of image data 114 loaded in registers 132, center pixel 216 of image data 114 is modified to compensate for the toner explosion conditions. In one embodiment, center pixel 216 of image data 114 is changed from "11" to "01" or "00" if pattern 212 matches. In other embodiments, other templates having different numbers of rows and columns and different patterns of ones and zeros can be used.

FIG. 4C is a diagram illustrating one embodiment of two toner explosion templates 220 and 222 for 2-bit gray code pattern matching. Toner explosion template 220 includes five rows and three columns of 2-bit gray code per pixel data. The center pixel, indicated at 224, is the pixel being examined for toner explosion compensation. If pattern 220 matches a portion of image data 114 loaded in registers 132, center pixel 224 of image data 114 is modified to compensate for the toner explosion conditions. In one embodiment, center pixel 224 of image data 114 is changed from "10" to "01" or "00" if pattern 220 matches.

Toner explosion template 222 also includes five rows and three columns, and the center pixel, indicated at 226, is the pixel being examined for toner explosion compensation. If pattern 222 matches a portion of image data 114 loaded in registers 132, center pixel 226 of image data 114 is modified to compensate for the toner explosion conditions. In one embodiment, center pixel 226 of image data 114 is changed from "10" to "01" or "00" if pattern 222 matches. In other embodiments, other templates having different numbers of rows and columns and different patterns of ones and zeros can be used. Templates or patterns 200, 202, 210, 212, 220, and 222 can be implemented in lookup tables or in logic instructions.

Figure 5:
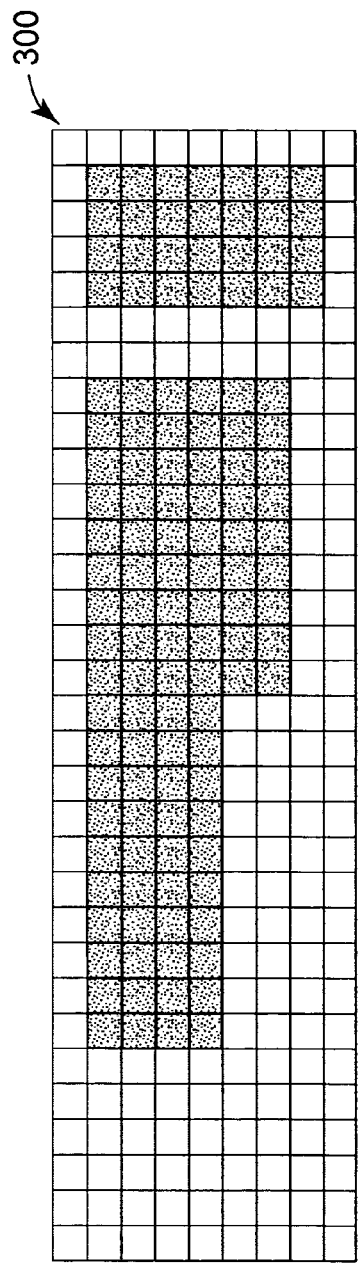
FIG. 5 is a diagram illustrating one embodiment of 1-bit per pixel sample data before toner explosion compensation is performed.

FIG. 5 is a diagram illustrating one embodiment of 1-bit per pixel (gray="1", white="0") sample data 300 before toner explosion compensation is performed. Sample data 300 has the potential to cause toner explosion if the data is not modified to remove some of the toner. Sample data 300 includes 32 columns by 9 rows of pixel data. In one embodiment, processor 122 utilizes registers 132 to examine sample data 300 to compensate for toner explosion, as described in further detail below with reference to FIG. 7.

Figure 6A:
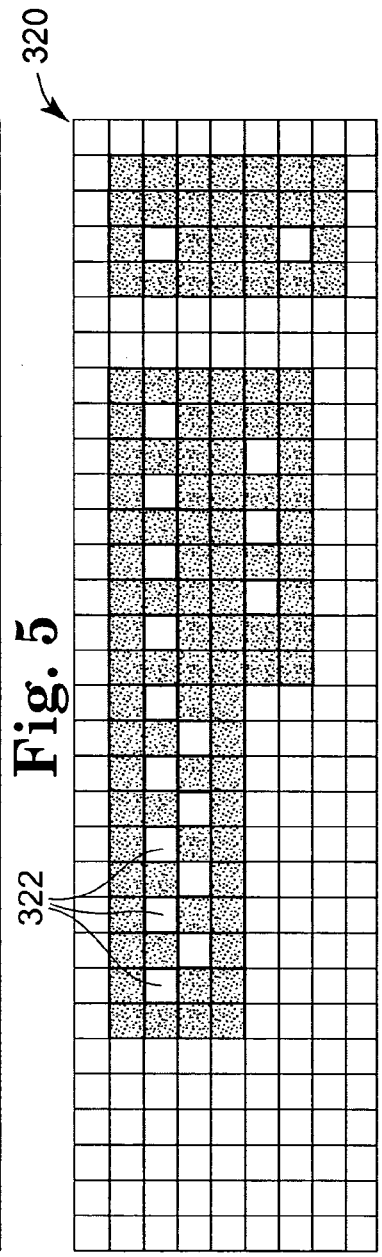
FIG. 6A is a diagram illustrating one embodiment of sample data after toner explosion compensation is performed on the sample data of FIG. 5.

FIG. 6A is a diagram illustrating one embodiment of sample data 320 after toner explosion compensation is performed on sample data 300. In this embodiment, sample data 300 is compared to patterns 200 and 202 and the center pixel data of image data 114 is changed from black ("1") to white ("0") if a match is found and to generate a checkerboard pattern (e.g., the sum of the row and column numbers mod two equals one), as indicated, for example, at 322. By removing some of the toner from sample data 300, toner explosion compensated sample data 322 substantially eliminates the possibility of toner explosion occurring.

Figure 6B:
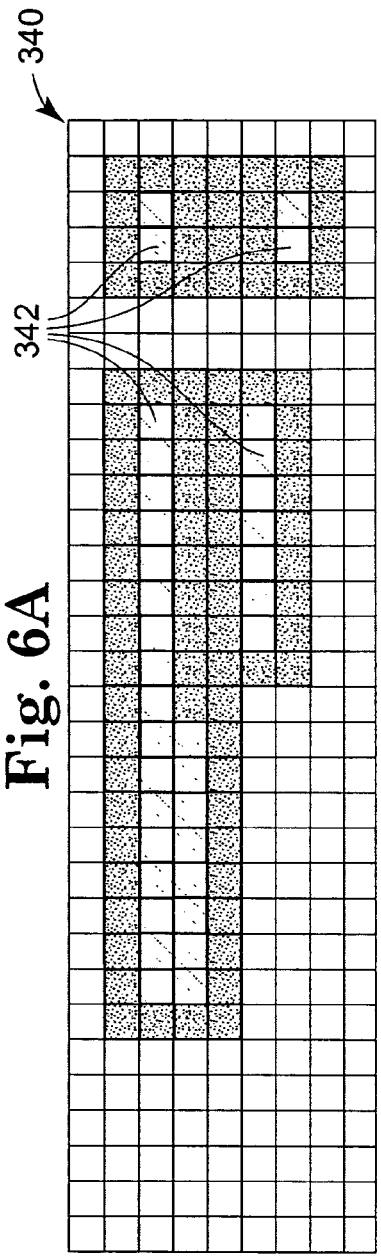
FIG. 6B is a diagram illustrating another embodiment of sample data after toner explosion compensation is performed on the sample data of FIG. 5.

FIG. 6B is a diagram illustrating another embodiment of sample data 340 after toner explosion compensation is performed on sample data 300. In this embodiment, sample data 300 is converted to 2-bit data and compared to patterns to find toner explosion conditions. If a match is found, the center pixel data of image data 114 is changed from gray (which is converted to "11") to "01" or "10" (a 2-bit value between black ("11") and white ("00")). Instead of placing no toner in the pixel being compensated for toner explosion as in sample data 320, less toner is placed in the pixel (i.e., "01" or "10"), as indicted at 342. By removing some of the toner from sample data 300, toner explosion compensated sample data 342 substantially eliminates the possibility of toner explosion occurring.

Figure 7:
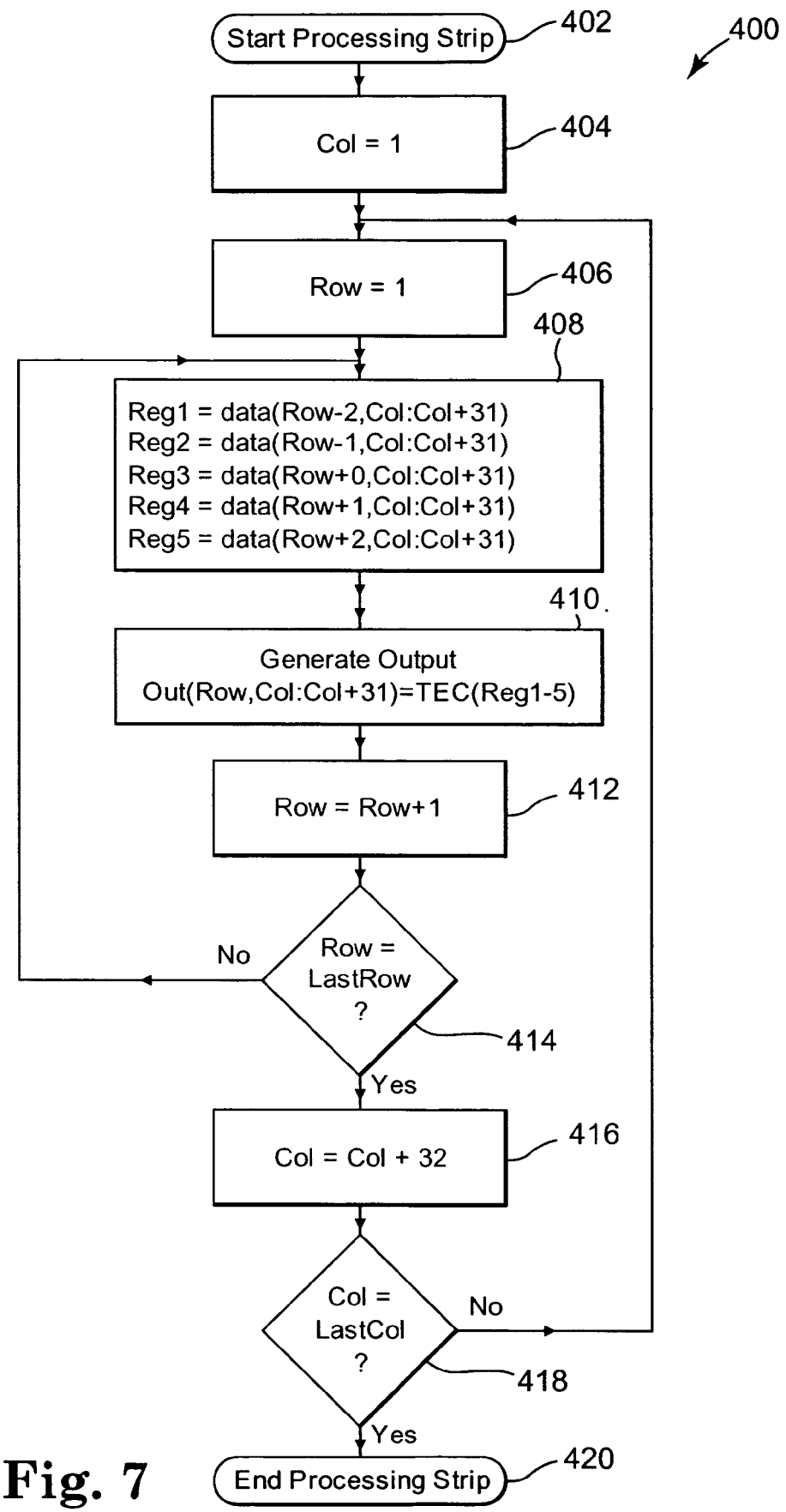
FIG. 7 is a flow diagram illustrating one embodiment of a method for performing toner explosion compensation.

FIG. 7 is a flow diagram illustrating one embodiment of a method 400 for performing toner explosion compensation on image data 114. In this embodiment, image data 114 is processed in strips. At 402, strip processing is started. At 404, the column (Col) of image data 114 is set equal to one. At 406, the row (Row) of image data 114 is set equal to one. At 408, registers Reg1-Reg5 of registers 132 are loaded. Reg1 is loaded with the data from Row−2, columns Col through Col+31. Reg2 is loaded with the data from Row−1, columns Col through Col+31. Reg3 is loaded with the data from Row, columns Col through Col+31. Reg4 is loaded with the data from Row+1, columns Col through Col+31, and Reg5 is loaded with the data from Row+2, columns Col through Col+31.

At 410, the patterns, such as patterns 200 and 202, 210 and 212, and 220 and 222, or other suitable patterns, are compared to the register data, excluding register data in Col and Col+31 (the boundary positions). If one or more matches are found, the data in Row, which is in Reg3, is modified. At 412, Row is incremented by one. At 414, processor 122 determines if the last row of image data 114 has been processed. If the last row of image data 114 has not been processed, then control returns to block 408 where the next partial row of image data 114 is loaded into registers 132 and processed. If the last row of image data 114 has been processed, then at 416, Col is incremented by 32. At 418, processor 122 determines if the last column of image data 114 has been processed. If the last column of image data 114 has been processed, then at 420, strip processing, and toner explosion compensation is complete. If the last column of image data 114 has not been processed, then control returns to block 406, where Row is again set equal to one and processing continues on the next group of columns at block 408. Although the flow diagram of FIG. 7 illustrates the scanning of strip image data in the vertical direction first, other scanning orientations, such as the horizontal direction first, can be used.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing apparatus comprising:
a memory configured to store image data; and
a processor in communication with the memory, the processor comprising registers, and configured to load a portion of the image data into the registers and perform toner explosion compensation by comparing a window of the image data to data indicative of toner explosion conditions and modifying at least a center pixel of the window of the image data based on the comparison of the window of the image data to the data indicative of toner explosion conditions, wherein the window is moved across the portion of the image data and toner explosion compensation is not applied when the window is located at a position such that the center pixel of the window is loaded in a boundary position of the registers, wherein the boundary position is either a first column or a last column in the registers.

2. The printing apparatus of claim 1, wherein the registers comprise at least five registers.

3. The printing apparatus of claim 1, wherein each register comprises one of 16-bits, 32-bits, 64-bits, and 128-bits.

4. The printing apparatus of claim 1, wherein the data indicative of toner explosion conditions is at least one pattern comprising five rows by three columns of pixel data.

5. The printing apparatus of claim 4, wherein the pixel data comprises 1- bit per pixel data.

6. The printing apparatus of claim 4, wherein the pixel data comprises 2- bit per pixel data.

7. The printing apparatus of claim 1, further comprising:
a laser print engine in communication with the processor for printing the image data.

8. The printing apparatus of claim 1, further comprising:
an input/output interface in communication with the processor and configured to receive the image data from a host.

9. The printing apparatus of claim 1, wherein the processor comprises a custom processor configured for performing custom toner explosion compensation instructions.

10. A printing system comprising:
a host; and
a printer coupled to the host, the printer comprising:
a memory configured to store image data received from the host; and
a processor in communication with the memory, the processor comprising registers, and configured to load a portion of the image data into the registers and perform toner explosion compensation by comparing a window of the image data to data indicative of toner explosion conditions and modifying at least a center pixel of the window of the image data based on the comparison of the window of the image data to the data indicative of toner explosion conditions, wherein the window is moved across the portion of the image data and toner explosion compensation is not applied when the window is located at a position such that the center pixel of the window is loaded in a boundary position of the registers, wherein the boundary position is either a first column or a last column in the registers.

11. A method for performing toner explosion compensation on image data, the method comprising:
loading a first portion of the image data into registers;
comparing a window of the first portion of the image data contained to a toner explosion pattern as the window is moved across the first portion of the image data such that image data is not compared to a toner explosion pattern when the window is located at a position such that a center pixel of the window is loaded in a boundary position of the registers; and
modifying at least a center pixel of the window of the first portion of the image data contained only in the non-boundary positions of the registers based on the comparison,
wherein the boundary position of the registers is either a first column or a last column in the registers.

12. The method of claim 11, further comprising:
loading a second portion of the image data into the registers;
comparing the second portion of the image data to the toner explosion pattern, excluding image data loaded in boundary positions in the registers; and
modifying the second portion of the image data based on the comparison.

13. The method of claim 12, wherein loading the first portion of the image data into the registers comprises loading a first portion of a row of the image data into the registers, and wherein loading the second portion of the image data into the registers comprises loading a second portion of the row of the image data into the registers.

14. The method of claim 13, wherein loading the second portion of the row of the image data comprises loading a portion of the row of image data adjacent the first portion of the row of the image data.

15. The method of claim 11, wherein loading the first portion of the image data into the registers comprises loading a portion of a row of the image data into a register.

16. The method of claim 15, wherein loading the portion of the row of the image data into the register comprises loading the portion of the row of the image data into one of a 16-bit register, a 32-bit register, a 64-bit register, and a 128-bit register.

17. The method of claim 15, wherein excluding image data loaded in boundary positions in the registers comprises excluding image data loaded in a first column and a last column of the register.

18. A printing apparatus comprising:
a memory configured to store image data comprising a plurality of pixels; and
a processor configured to analyze all of the image data and configured to perform toner explosion compensation on the image data by comparing a window of the image data to data indicative of toner explosion conditions and modifying at least a center pixel of the window of the image data based on the comparison of the window of the image data to the data indicative of toner explosion conditions,
wherein analysis of all of the image data comprises designating each of the plurality of pixels into one of a first subset and a second subset; wherein pixels in the second subset are in a first column or a last column of the memory; and
wherein the window is moved across the image data such that toner explosion compensation is performed on the first subset and toner explosion compensation is not performed when the center pixel of the window is designated into the second subset.

19. The print apparatus of claim 18, wherein pixels in the second subset are not designated into the first subset in future iterations of toner explosion compensation.

20. The print apparatus of claim 18, wherein the pixels designated the second subset are not subsequently designated as the first subset.

21. The print apparatus of claim 18, wherein the image data is processed in strips.

22. The printing apparatus of claim 18, further comprising:
a laser print engine in communication with the processor for printing the image data.

* * * * *